US006597669B1

United States Patent
Takahashi et al.

(10) Patent No.: US 6,597,669 B1
(45) Date of Patent: Jul. 22, 2003

(54) QUEUE SEGMENTATION AND ADDRESSING METHOD AND APPARATUS FOR A CELL SWITCH IN A PROCESSING COMMUNICATIONS SATELLITE

(75) Inventors: Scott M. Takahashi, Torrance, CA (US); Roland Y. Wong, Monrovia, CA (US); Darren R. Gregoire, Redondo Beach, CA (US); Jaime L. Prieto, Jr., Torrance, CA (US); Gefferie H. Yee-Madera, San Gabriel, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/270,938

(22) Filed: Mar. 16, 1999

(51) Int. Cl.[7] ............................................. H04B 7/204
(52) U.S. Cl. ...................... 370/325; 370/412; 370/417; 370/418; 370/310.1; 370/395
(58) Field of Search ................................ 370/412, 417, 370/418, 310.1, 395.25, 395.32, 395.4, 395.43, 395.7, 325

(56) References Cited

U.S. PATENT DOCUMENTS 5,440,547 A * 8/1995 Easki et al. ............... 370/395.3
5,784,372 A * 7/1998 Faulds ........................ 370/398
6,154,460 A * 11/2000 Kerns et al. ................ 370/398
6,157,621 A * 12/2000 Brown et al. ............... 370/310

* cited by examiner

Primary Examiner—William Trost
Assistant Examiner—Danh C Le
(74) Attorney, Agent, or Firm—McAndrews, Held & Malloy, Ltd.

(57) ABSTRACT

The present invention is a method and apparatus for processing data packets in the outbound module of a space-based cell switch. The present invention uses an expanded set of queuing parameters to determine an output queue in which to store each data packet. The method includes the steps of selecting an expanded set of queuing parameters (202), establishing several output queues (204) based on combinations of the expanded set of queuing parameters, receiving data packets in a communications uplink (206), examining the header portion of each received data packet (208, 210 and 212), determining an appropriate output queue in which to store the data packet (214 and 216), and switching the received data packets to that appropriate output queue (218). The present apparatus includes several input modules (102), a switch control output (114) connected between the input module (102) and a switch fabric (104), and a several output modules (106) connected to the switch fabric (104). The input modules (102) each include a discriminator circuit (108) distinguishing among several combinations of queuing parameters from an expanded set of queuing parameters, and the output modules (106) each include several output queues (116) and a cell selector (118) for selecting the destination output queue in which to store each data packet.

26 Claims, 3 Drawing Sheets

QUEUE SEGMENTATION AND ADDRESSING METHOD AND APPARATUS FOR A CELL SWITCH IN A PROCESSING COMMUNICATIONS SATELLITE

BACKGROUND OF THE INVENTION

The present invention relates to satellite communications. More specifically, the present invention relates to a method and apparatus for queuing data packets in the outbound module of a space-based cell switch using an expanded set of queuing parameters.

Satellites have long been used to provide communications capabilities on a global scale, allowing various earth terminals to communicate with each other from anywhere on earth. Some satellite communications systems divide data traffic into discrete pieces of information, and each discrete piece of information may subsequently be transmitted over different selected channels in the communications network. The discrete pieces of information are referred to as "frames" or "data packets," depending on the particular system.

One popular terrestrial network information unit is the Asynchronous Transfer Mode (ATM) cell; also called a Fast-Packet. Each ATM cell is a specifically formatted data packet that is 53 bytes long and includes 48 information bytes (referred to below as an "information" field) and 5 header bytes (called a "header" field). The header field further includes an identifier. The identifier contains information about the cell including, for example, bits of information representing quality of service (QOS) parameters (discussed below), and addressing information. The addressing information may be, for example, a Virtual Path Identifier/Virtual Channel Identifier (VPI/VCI) address.

ATM standards define the components of the five-byte header field of an ATM cell. An ATM cell is typically associated with a set of QOS parameters. The QOS parameters include, for example, cell loss ratio (CLR), cell error ratio (CER), cell misinsertion rate (CMR), cell delay variation (CDV) and burstiness of traffic (BOT). In general, the combination of QOS parameters associated with a particular connection may be represented by an assigned priority of cells belonging to a connection.

CLR represents the ratio of the number of dropped cells divided by the total number of cells received. Cells are generally dropped in two situations. The first is overflow of the buffers used for queuing ATM cells before switching. The second is errors in the cell header, which prevent the ATM cell from being reliably identified.

CDV represents the difference between the longest time it may take for a cell to be transferred on a downlink, and the shortest time it may take for that cell to be transferred. This generally depends on how full or empty the output queue is in which the cell is waiting. For example, if the queue is empty, the cell may be transferred out of the queue the moment it arrives (i.e., $t_{low}$). However, if the queue is very full, it may take a longer period of time (i.e., $t_{high}$) before the cell is transferred. Thus, the variation is $$CDV = t_{high} - t_{low}.$$

CER represents the probability that the information field of a delivered cell contains an error, and BOT represents how constant or sporadic the stream of data being transferred is. Finally, CMR represents the probability that an "uninvited" cell will be delivered.

In the past, a bar to using traditional terrestrial switch designs for a space-based application was that an earth terminal could not necessarily receive all of the data being sent down a particular downlink due to multiple configurations. The downlink can be broken into time slots whose configuration depends on several parameters including, for example, frequency, coding, antenna pointing and polarization of the downlink at the time the satellite transmits the information. Unlike information transmitted terrestrially, an earth terminal may only receive information in a given downlink in time slots matching its configuration, because earth terminals may only be configured to receive a particularly configured downlink at any given moment in time.

Thus, space-based systems, unlike terrestrial systems, face unique challenges in their delivery of information to ground stations. In other words, past terrestrial protocols were generally not suitable for transporting data cells via processing communications satellites.

Furthermore, prior proposed satellite communications systems generally advocated a very restrictive queue segmentation and addressing procedure. In accordance with this restrictive procedure, as information arrived at an output module of a cell switch, information was stored in an output queue until there was an opportunity to transmit it. In the past, however, output queues represented only information priorities, where each priority was associated with a combination of QOS parameters. For example, if a switch supported 32 different priorities, the output module of that cell switch would include only 32 different output queues. Accordingly, a single output queue stored all information having the priority associated with that queue. The queues were then serviced in a sequence which would support the QOS parameters.

Thus, in the past, an extensive time- and power-consuming search was required to locate, in a queue, stored information in that queue for transmitting in a particularly configured downlink slot. Understandably, in an effort to ensure that each cell was transmitted in an appropriate downlink slot, past systems required additional hardware necessary for searching through the output queues (e.g., in order of first-in to last-in) to find a cell acceptable for transmission on a particularly configured downlink slot. If the downlink was not configured to transmit any of the information contained in the highest priority queue, the switch continued to search through the queues until information corresponding to the currently configured downlink was found.

There are several disadvantages to this searching method. First, as explained above, additional hardware is necessary to implement the searching function. Additional hardware, of course, increases both the weight and complexity of a satellite. Ultimately, the increase in weight and complexity creates a substantial increase in the overall cost of the satellite and a decrease in reliability.

Second, searching functions were very time consuming. Thus, searching potentially results in substantial decreases in the downlink efficiency. For example, if the output module takes a very long time to find an appropriate cell, the satellite may altogether miss an opportunity to transmit a cell because the downlink structure must proceed with exact regularity. Thus, an empty or null cell is transmitted instead. This waste of downlink bandwidth is undesirable because downlink capacity is very limited and is the principal source of revenue in a satellite communication system.

A need exists in the satellite communications industry for a less costly and more efficient method and apparatus for processing data packets in the outbound module of a space-based cell switch.

BRIEF SUMMARY OF INVENTION

It is an object of the present invention to enhance the efficiency of the output queuing system of a space based cell switch.

It is another object of the present invention to simplify the output queuing system of a space based cell switch by eliminating, for example, queue-searching hardware.

It is another object of the present invention to minimize the amount of wasted downlink bandwidth in a satellite communications system.

It is another objective of the present invention to decrease the amount of hardware needed to process signals on a communications satellite.

It is another objective of the present invention to decrease the complexity of the output module hardware on a communications satellite. One or more of the foregoing objects is met in whole or in part by a method and apparatus for processing data packets in the outbound module of a space-based cell switch. The present invention uses an expanded set of queuing parameters to determine the appropriate output queue (i.e., a destination output queue) in which to store each data packet. The method includes the steps of receiving data packets at an uplink receiver, determining at least one non-quality of service (NQOS) parameter associated with said data packets, and ordering a list of packets (described in more detail below) according to the NQOS parameter. The NQOS parameters may include, but are not limited to, the destination beam area, the cell type, the coding rate and any other similar satellite communications parameters.

In addition, in response to a signal indicating that a downlink transmitter is ready to transmit, the method locates, from a subset of queues which match the NQOS parameters, a data packet based on QOS parameters, and transfers the located data packet to the transmitter. In this fashion, the time required to locate an appropriate data packet is greatly reduced.

The present apparatus for determining destination output queues based on an expanded set of queuing parameters may be implemented in a cell switch for a processing communications satellite. The cell switch includes an input module, a switch control output connected between the input module and a switch fabric, and an output module connected to the switch fabric. The input module includes a discriminator circuit which determines the switch control output based on a representative combination of the expanded set of queuing parameters. The output module includes numerous output queues assigned to combinations of the expanded set of queuing parameters. The output module further includes a cell selector for selecting the appropriate output queue in which to store each data packet.

DETAILED DESCRIPTION OF THE PREFERRED EMBODIMENTS

Figure 1:
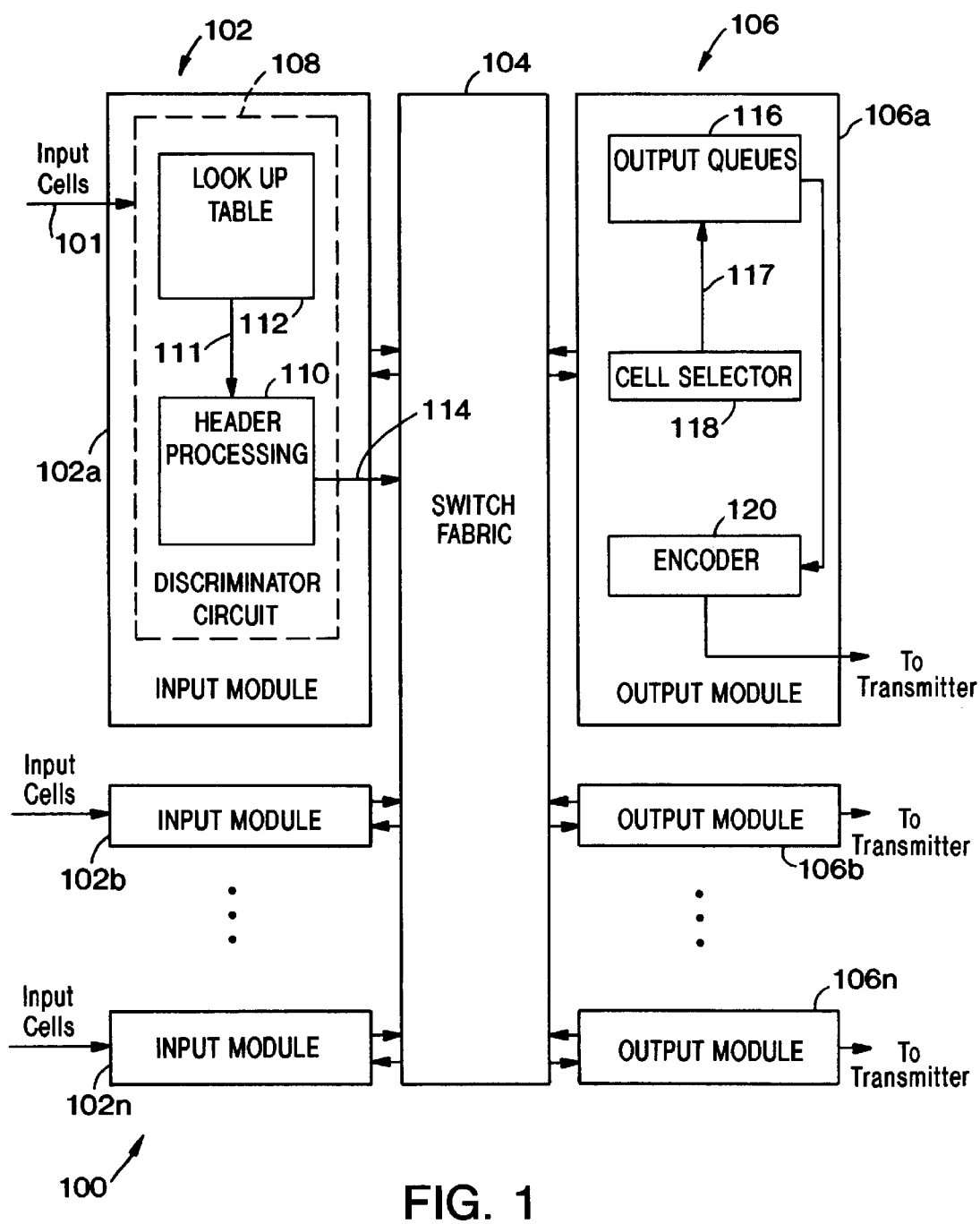
FIG. 1 illustrates a block diagram of a space-based cell switch for use in a processing communications satellite.

FIG. 1 shows a block diagram of a cell switch 100 for use in a processing communications satellite. It is noted that although the discussion below proceeds with reference to ATM cells, the invention is not limited to ATM cells or ATM networks. The invention may be implemented with any other suitably formatted data that includes header information as described below.

The cell switch 100 includes a data packet input 101 for receiving data packets, several input modules 102, a switch fabric 104 and several output modules 106. Each of the input modules 102 further includes a discriminator circuit 108 which generally examines the header of each incoming cell. In a preferred embodiment of the present invention, the discriminator circuit 108 comprises a look up table 112, a queue selection signal output 111, and a header processor 110 (which includes a switch control output 114). Each of the output modules 106 of the cell switch 100 includes a cell selector 118, a queue selection output signal 117, output queues 116, and an encoder 120.

The header processor 108 examines the header field of cells received by the cell switch 100, to determine to which output module and by which QOS parameters and non-quality of service (NQOS) parameters the cell is queued. The NQOS parameters may include, for example, the destination beam area, the cell type, the coding rate and any other similar satellite communications parameters. The combined set of parameters supported by the cell switch, including the QOS and NQOS parameters, will be referred to below as the expanded set of queuing parameters.

Each NQOS parameter is generally comprised of a plurality of parameter subclasses. For example, while the coding rate is a NQOS parameter, the satellite may be able to support several different coding rates. Each different coding rate is a parameter subclass.

As explained further below, the examining function performed by the discriminator circuit 108 may be performed by a header processor 110 and a look up table 112, both of which are part of the discriminator circuit 108. It is noted that in alternative embodiments, a hardwired identifier logic unit or a CPU/software combination may be used instead of the look up table 112. Similarly, the header processor 110 may comprise hardwired logic or a CPU/software combination that translates the queue selection signal 111 into the switch control output 114. The switch control output 114 controls the connection of inputs to outputs in the switch fabric 104.

Turning to the output modules 106, the output queues 116 in each output module 106 preferably include a separate output queue corresponding to every combination of queuing parameters in the expanded set of queuing parameters. The number of output queues 116 in a given output module 106 is generally equal to the product of the number of subclasses for each supported NQOS parameter and the number of different priorities. For example, if a particular output module 106n of the cell switch 100 supports X priorities, Y beam area subclasses and Z coding rate subclasses, the total number of output queues for that output module 106n would be X*Y*Z. This is further explained below with respect to FIG. 3. The cell selector 118 is a logic unit that determines from which output queue to transmit a next cell (i.e., a transmission cell) on the next downlink. The encoder 120 may be, for example, an error correction coder such as a Reed-Solomon encoder.

As stated above, each output module 106 preferably includes a separate output queue corresponding to each combination of queuing parameters in the expanded set of queuing parameters that is supported by a particular output module 106. For example, if the expanded set of queuing parameters supported by a particular output module 106b includes 4 different priorities (i.e., A, B, C and D), 2 coding rate subclasses (i.e., Fast (F) and slow (S)) and 2 beam area subclasses (i.e., X and Y), 16 different queues would preferably be established in that output module 106b, corresponding to the following combinations shown below in Table 1:

TABLE 1

| QUEUE NO. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| PRIORITY | A | A | A | A | B | B | B | B | C | C | C | C | D | D | D | D |
| CELL RATE | F | F | S | S | F | F | S | S | F | F | S | S | F | F | S | S |
| BEAM AREA | X | Y | X | Y | X | Y | X | Y | X | Y | X | Y | X | Y | X | Y |

For example, returning to FIG. 1, consider a cell received at an input module 102a of the cell switch 100 having a particular output module destination 106b, a priority of B, a beam area destination Y, and intended to be transmitted with a fast coding rate (F). In response, the switch control output 114 signals the switch fabric 104 to switch this cell to the proper output module 106b. The switch control output 114 also instructs the output module 106b to insert the cell into queue number 6. Similarly, if an input module 102a of the cell switch 100 receives a cell destined for a particular output module 106a, having priority D, intended for transmission with a slow coding rate and destined for beam area X, the switch control output 114 would signal the output module to direct this cell to queue number 16 of the output module 106a.

In alternative embodiments, the switch fabric 104 may be replaced with hardwired logic, a bus structure, or another set of circuitry capable of routing the cells to a particular destination. Thus, the switch fabric 104 may perform an initial switching function based on the output module which corresponds to one or more physical beams, while the output module may actually include the logic or switching for placing the cells into an ordered list based on QOS and NQOS parameters.

It is noted that in alternative embodiments, the output queues may be replaced with substitute data organization arrangements. As an example, the cells may be stored in a general purpose memory upon receipt. In conjunction with the memory, a table of pointers to the cells (ordered according to the expanded set of queuing parameters) in the memory may then be stored. Thus, both the queue structure and the pointer table may be considered ordered lists that allow much faster access to appropriate cells for a particular downlink.

Figure 3:
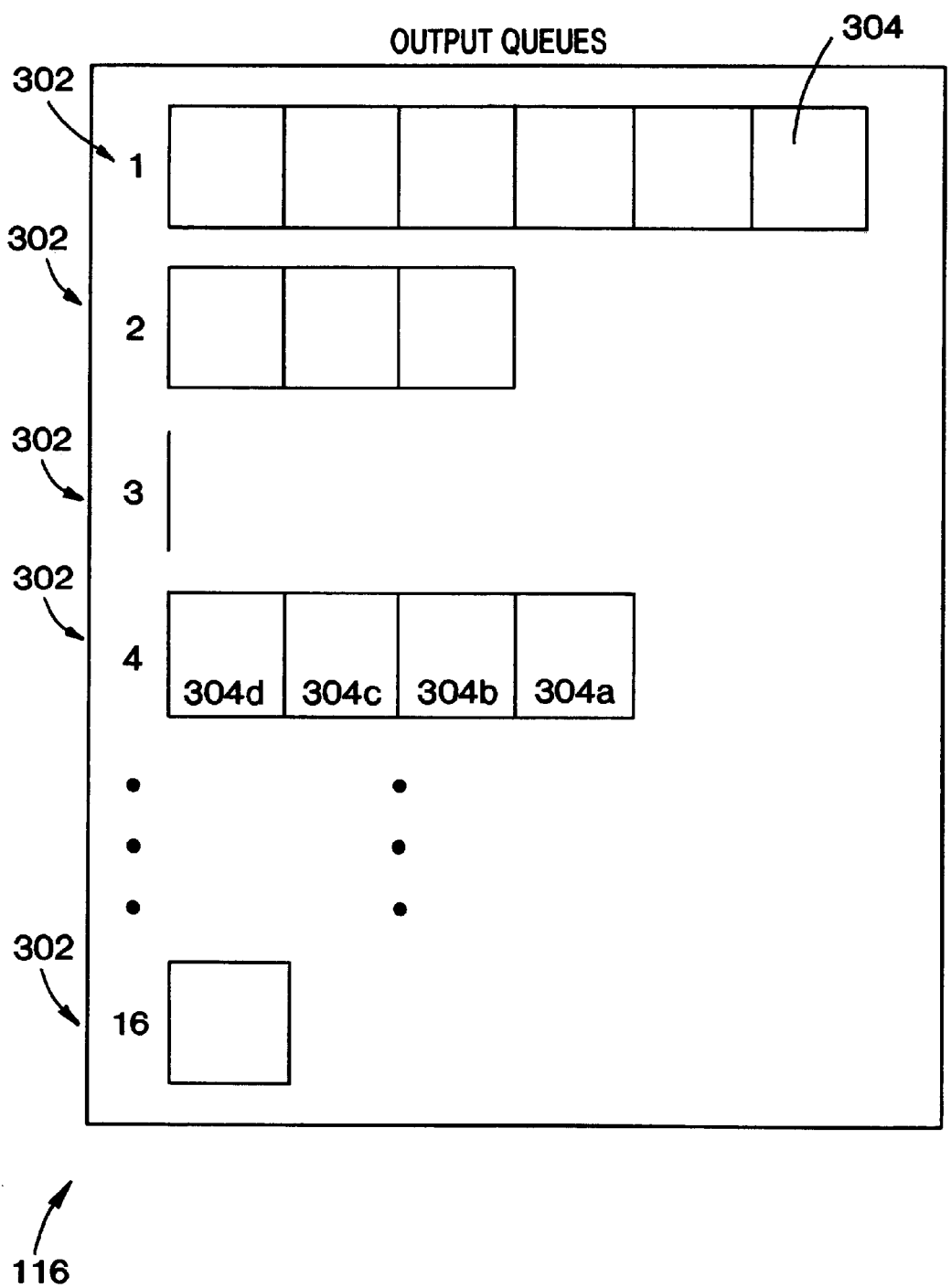
FIG. 3 illustrates a more detailed diagram of the output queues from FIG. 1.

FIG. 3 illustrates a more detailed diagram of the output queues 116 in accordance with the present invention. In general, there is a predetermined number (e.g., 16) of output queues 302 in an output module of a cell switch. The 16 output queues shown in FIG. 3 represent the 16 output queues in Table 1 above. Each output queue 302 may store several cells 304, with each cell 304 generally being stored on a first in first out ("FIFO") basis. For example, FIG. 3 shows that queue number 4 is currently storing 4 cells 304a, 304b, 304c and 304d. As soon as a downlink configured to transmit a slow coded cell to beam area Y is ready to transmit an A priority cell, the "first-in" cell 304a will typically be transmitted in that downlink.

The queues 302 may be dynamically created and destroyed in memory with the arrival and departure of cells or may be statically assigned to each queue if desired. Dynamic allocation, however, avoids wasting buffer space for queues with little data (i.e., queue number 16) or no data (i.e., queue number 3).

Taking another example, a cell switch may support a beam which services 16 different beam areas, 2 different coding rates and 32 different priorities. In this case, the expanded set of queuing parameters includes two NQOS parameters (i.e., beam area and coding rate) and various QOS parameters representing the 32 different priorities. The beam area parameter includes 16 subclasses, the coding rate parameter includes 2 subclasses, and the QOS parameters include 16 different priorities. Thus, 1024 (i.e., 2×32×32) output queues are established, and each different output queue represents a unique combination of queuing parameters.

Figure 2:
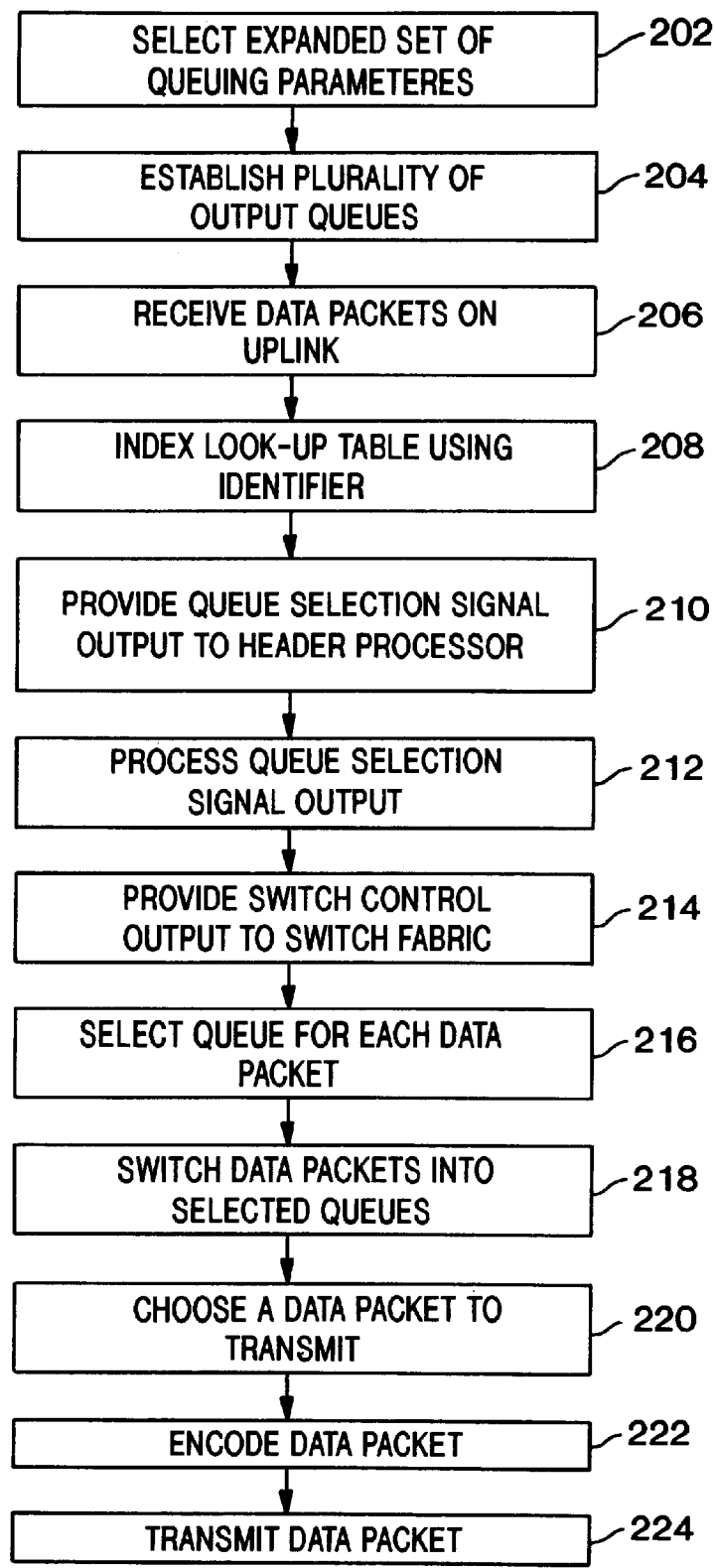
FIG. 2 illustrates a flow chart of a method of processing data packets using a set of output queues according to a particular embodiment of the present invention.

FIG. 2 shows a flow chart of a method of processing data packets using the output queues described above with regard to FIG. 3. The first step 202 is to select an expanded set of queuing parameters. The selection is generally based on the specific goals and requirements of the system. For example, one system may minimize the amount of time lost searching for a proper cell to transmit and therefore, provide many NQOS parameters. On the other hand, another system may minimize the complexity of the queuing system and therefore, provide relatively fewer NQOS parameters.

At step 204, several output queues are established based on combinations of queuing parameters in the expanded set of queuing parameters. As explained above with respect to FIG. 3, a different output queue will generally be established for every possible combination of queuing parameters. Thus, the total number of output queues will generally equal the product of the number of subclasses of each parameter in the expanded set of queuing parameters.

At step 206, cells are received on an uplink from an earth terminal. The next 3 steps include indexing the look up table (208), providing a queue selection output signal (210) to a header processor, and processing the queue selection signal output (212), respectively. These three steps (208, 210 and 212) perform an examination of the identifier, and they are described below.

In FIG. 1, after a cell is received by the cell switch 100, that cell's identifier may be used as an address into the look up table 112. This generally corresponds to the step of indexing a look-up table (208). The information contained in the addressed location of the look up table 112 is then sent to the header processor 110 via a queue selection signal output 111. This generally corresponds to the step of providing a queue selection signal output to the header processor (210). The queue selection signal output 111 is then processed by the header processor 110 (step 212).

For example, returning to Table 1, a cell received at an input module 102 of the cell switch 100 may be intended to be transmitted to a particular output module 106b, destined for beam area X, with a fast coding rate and a B priority. The identifier of the cell forms an address, and the data at that address of the look up table 112 is sent to the header processor 110 via a queue selection signal output 111 representing queue number 5. The header processor 110 then processes the queue selection signal output 111 to generate a switch control output 114. The switch control output 114 then instructs the switch fabric 104 to switch this particular cell from the switch input to the intended output module 106b. The switch control output 114 instructs the intended output module 106b to store the cell in queue number 5 of that output module 106b.

Returning to FIG. 2, the next three steps include providing a switch control output to the switch fabric (214), selecting an appropriate queue (216) in which to store each cell, and then switching the cell into that appropriate queue (218). The steps of providing a switch control output to the switch fabric and selecting an appropriate queue in which to store each cell (214 and 216) perform the determination of a destination output queue.

As illustrated in FIG. 1, the header processor 110 provides a switch control output 114 to the switch fabric 104 and the destination output module 106n (step 214). The switch control output 114 indicates to the switch fabric 104 the destination output module 106n to which the cell is to be routed, thereby connecting switch inputs to switch outputs. The switch control output 114 further indicates to the destination output module 106n, the proper queue within that output module 106n in which to store each of the received cells. This generally corresponds to the step of selecting a queue for each cell (216).

As explained above with respect to FIG. 3, the appropriate queue in which to store each cell is based on the unique combination of queuing parameters associated with each cell. For example, if a particular cell destined for a specific output module has a priority level of X, a coding rate of Y and a destination beam area Z, the switch control output containing this information instructs the switch fabric to select the corresponding queue (i.e., the queue representing the unique combination of parameters X, Y and Z) in the specific output module, and stores this cell in that queue.

As shown in FIG. 2, the next three steps include choosing a cell to transmit (220) on the next downlink, encoding that cell (222) for transmission and then transmitting (224) the cell. In FIG. 1, the cell selector 118 of the output module 106 provides a queue selection output signal 117 indicating from which queue to select a cell for transmission. This generally corresponds to the step of choosing a cell to transmit (220). The cell selector 118 determines from which queue to select a cell based on both a predetermined order of priority and the configuration of the next downlink. For example, if the downlink is configured to transmit a high-coded cell to beam area X, then the cell selector will take the first cell from the highest priority queue representing high coded cells with destinations in beam area X. This cell may then be encoded and transmitted on the next downlink.

The present invention provides several important advantages over the prior art. First, the present invention eliminates the need to search through output queues to find an appropriate cell to transmit on the next downlink. Searching is eliminated because there are preferably as many different output queues as there are possible downlink configurations. Thus, the satellite may transmit the first cell in the selected queue (i.e., the queue corresponding to the current satellite configuration), without having to perform the slow searching function required in the past to find an appropriate cell to transmit.

As a result, there is a greatly reduced probability that the present cell switch will miss an opportunity to transmit a cell on the downlink. The downlink efficiency is correspondingly increased. Furthermore, the cell delay variation is reduced because cells near the back of a queue do not have to wait any additional time to be transmitted due to the slow searching process of the prior systems.

Another advantage of the present invention is that the present cell switch contains substantially less hardware, thus making the apparatus much lighter and much less complex, than prior cell switches. As explained above, the additional hardware and complexity necessary to implement prior searching functions substantially increases the cost of the satellite and decreases reliability.

The present invention thus provides an efficient, low cost, low complexity solution to space-based cell switching. While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A cell switch for a processing communications satellite, the switch comprising:

at least one data packet input for receiving data packets;

at least one processor associating the data packets with at least one non-quality of service parameter and generating an ordered list based at least in part on said at least one non-quality of service parameter; and at least one memory storing said ordered list at the output of said cell switch, whereby the time required to locate said data packets associated with said at least one non-quality of service parameter may be reduced.

2. The cell switch of claim 1 wherein said processor comprises a look up table indexed by an identifier, said look up table including a queue selection signal output.

3. The cell switch of claim 2 wherein said processor further comprises a header processor connected between said queue selection signal output and a switch control output.

4. The cell switch of claim 2 wherein said data packets are ATM cells comprising:

an information field; and a header field including said identifier.

5. The cell switch of claim 1 wherein said ordered list comprises a plurality of output queues corresponding to a combination of queuing parameters from an expanded set of queuing parameters including at least one non-quality of service parameter.

6. The cell switch of claim 5 wherein said expanded set of queuing parameters includes a coding rate parameter and a beam area parameter.

7. The cell switch of claim 5 wherein said plurality of output queues includes an output queue for each unique combination of queuing parameters in said expanded set of queuing parameters.

8. The cell switch of claim 1 wherein said ordered list comprises a plurality of output queues corresponding to a combination of queueing parameters from an expanded set of queuing parameters including at least one non-quality of service parameter, said plurality of output queues including a separate output queue for each unique combination of queuing parameters in said expanded set of queuing parameters.

9. The cell switch of claim 8 further comprising a cell selector, said cell selector including a queue selection output connected to said plurality of output queues.

10. The cell switch of claim 9 further comprising an encoder coupled between said output queues and a transmitter.

11. The cell switch of claim 1 further comprising at least one additional data packet input and wherein said data packet inputs are assigned to individual uplinks.

12. In a satellite communications system comprising an uplink receiver and a downlink transmitter for respectively receiving and transmitting data packets characterized by at least one non-quality of service parameter, an improved method for locating data packets for transmission, the method comprising:

receiving data packets at an uplink receiver;

determining at least one non-quality of service parameter associated with said received data packets;

ordering a list according to said at least one non-quality of service parameter;

generating a signal indicating that the downlink transmitter is preparing to transmit;

locating a data packet associated with the at least one non-quality of service parameter based on said list; and transferring said located data packet to said transmitter, whereby the time required to locate said data packet is reduced.

13. The method of claim 12, wherein said step of ordering a list comprises creating a plurality of output queues representing unique combinations of queuing parameters from an expanded set of queuing parameters including said at least one non-quality of service parameter, and storing said data packets in one of said output queues.

14. The method of claim 12, wherein said step of ordering a list comprises storing said data packets in a memory and creating a table of pointers to said memory ordered by said at least one non-quality of service parameter.

15. The method of claim 13 wherein said step of locating further comprises generating a queue selection signal indicative of one of said output queues.

16. The method of claim 15 wherein said step of ordering further comprises indexing a look up table and generating said queue selection signal.

17. The method of claim 13 wherein said step of ordering a list comprises the steps of:

providing a switch control output to a switch fabric;

transferring said data packets through said switch fabric to output modules; and storing each of said data packets in an output queue.

18. The method of claim 13 wherein said step of creating a plurality of output queues comprises statically establishing said plurality of output queues.

19. The method of claim 13 wherein said step of creating a plurality of output queues comprises dynamically establishing said plurality of output queues.

20. The method of claim 19 further comprising the step of deleting at least one of said queues when empty.

21. In a satellite communication system comprising an uplink receiver and a downlink transmitter for transmitting data packets characterized by at least one non-quality of service parameter, an improved data locating apparatus comprising:

means for receiving data packets at an uplink receiver;

means for determining at least one non-quality of service parameter associated with said received data packets;

means for ordering a list according to said at least one non-quality of service parameter;

means for generating a signal indicating that the downlink transmitter is preparing to transmit;

means for locating a data packet associated with said at least one non-quality of service parameter based on said list; and means for transferring said located data packet to said transmitter, whereby the time required to locate said data packet is reduced.

22. The apparatus of claim 21, wherein said list comprises a plurality of output queues representing unique combinations of queuing parameters from an expanded set of queuing parameters including said at least one non-quality of service parameter, said output queues storing said data packets.

23. The apparatus of claim 22 further comprising:

means for providing a switch control output to a switch fabric;

means for transferring said data packets through said switch fabric to output modules; and means for storing each of said data packets in an output queue.

24. The apparatus of claim 21, wherein said list comprises a table of pointers to a memory ordered by said at least one non-quality of service parameter, said memory storing said data packets.

25. The apparatus of claim 21 further comprising a queue selection signal output providing a queue selection signal indicative of one of said output queues.

26. The apparatus of claim 25 further comprising means for indexing a look up table and generating said queue selection signal.

* * * * *